United States Patent [19]

Plummer

[11] 3,896,260

[45] July 22, 1975

[54] POWDER FILLED CABLE SPLICE ASSEMBLY

[76] Inventor: Walter A. Plummer, 3546 Crownridge Dr., Sherman Oaks, Calif. 91403

[22] Filed: Sept. 16, 1974

[21] Appl. No.: 506,599

Related U.S. Application Data

[63] Continuation-in-part of Ser. No. 347,435, April 3, 1973, Pat. No. 3,836,702.

[52] U.S. Cl. .................... 174/92; 174/22; 174/76
[51] Int. Cl. ............................................ H02g 15/08
[58] Field of Search .......................... 174/91–93, 174/76, 77 R, 22, 23 R, 23 C; 156/49, 51; 339/115 R, 115 C, 116 R

[56] References Cited
UNITED STATES PATENTS

| | | | |
|---|---|---|---|
| 2,930,835 | 3/1960 | Bollmeier | 174/92 X |
| 3,619,481 | 11/1971 | Smith | 174/93 X |
| 3,836,694 | 9/1974 | Kapell | 174/22 |
| 3,836,702 | 9/1974 | Plummer | 174/92 |

*Primary Examiner*—Darrell L. Clay
*Attorney, Agent, or Firm*—Spensley, Horn & Lubitz

[57] ABSTRACT

A powder filled cable splice assembly for enclosing and protecting one or more spliced conductors in a cable is disclosed. The assembly comprises an inner cover which is filled with a protective powder and disposed around the spliced conductors, and an outer jacket, enclosing the inner cover and the conductors. The outer jacket has a valve secured thereto which enables a liquid foam material to be injected into the jacket. The liquid foam material, after expanding and hardening, forms a relatively solid insulative foam which compresses the powder in the inner cover around the conductors. The assembly thus formed protects the joints of the spliced conductors in the cable from the environment.

12 Claims, 11 Drawing Figures

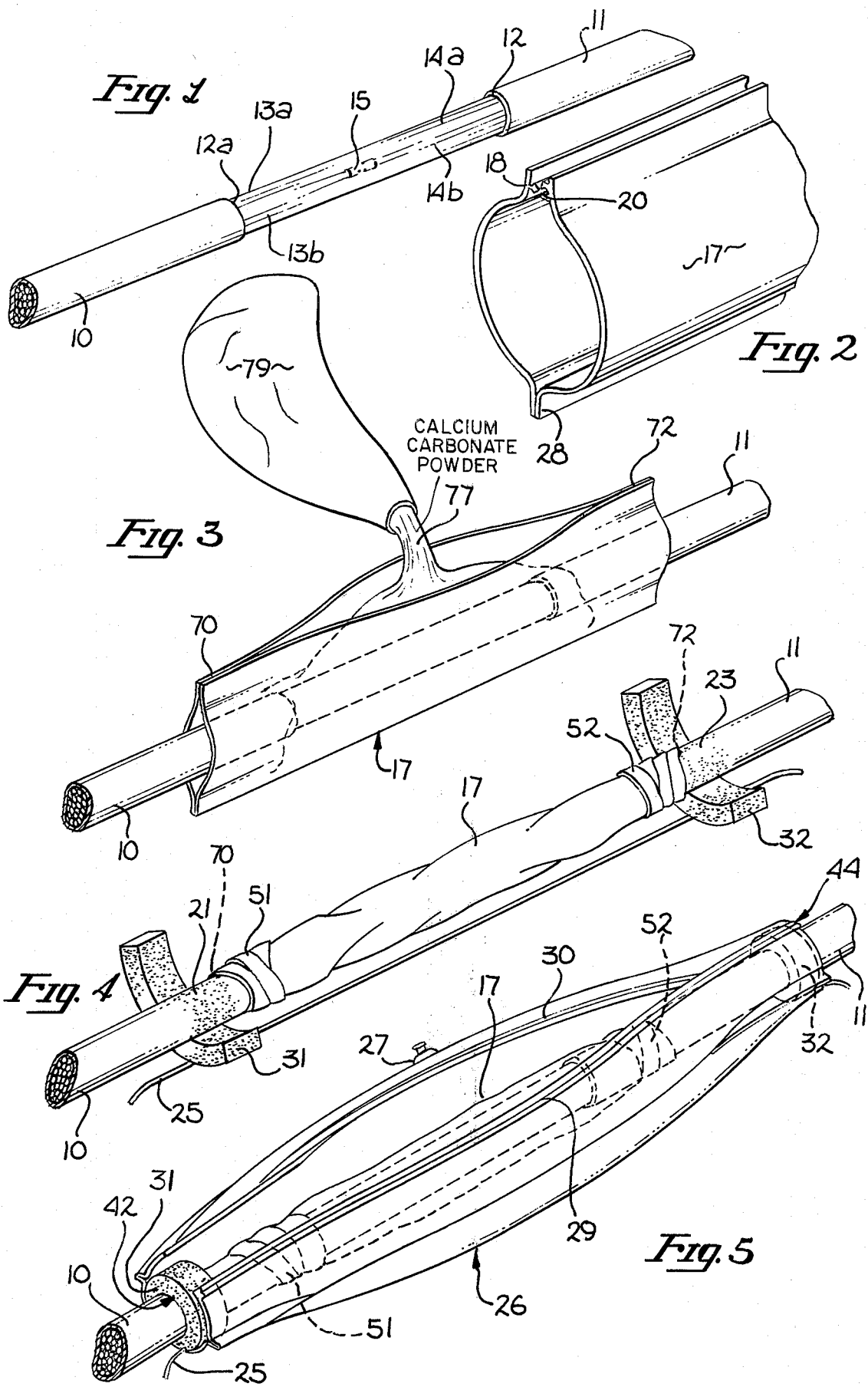

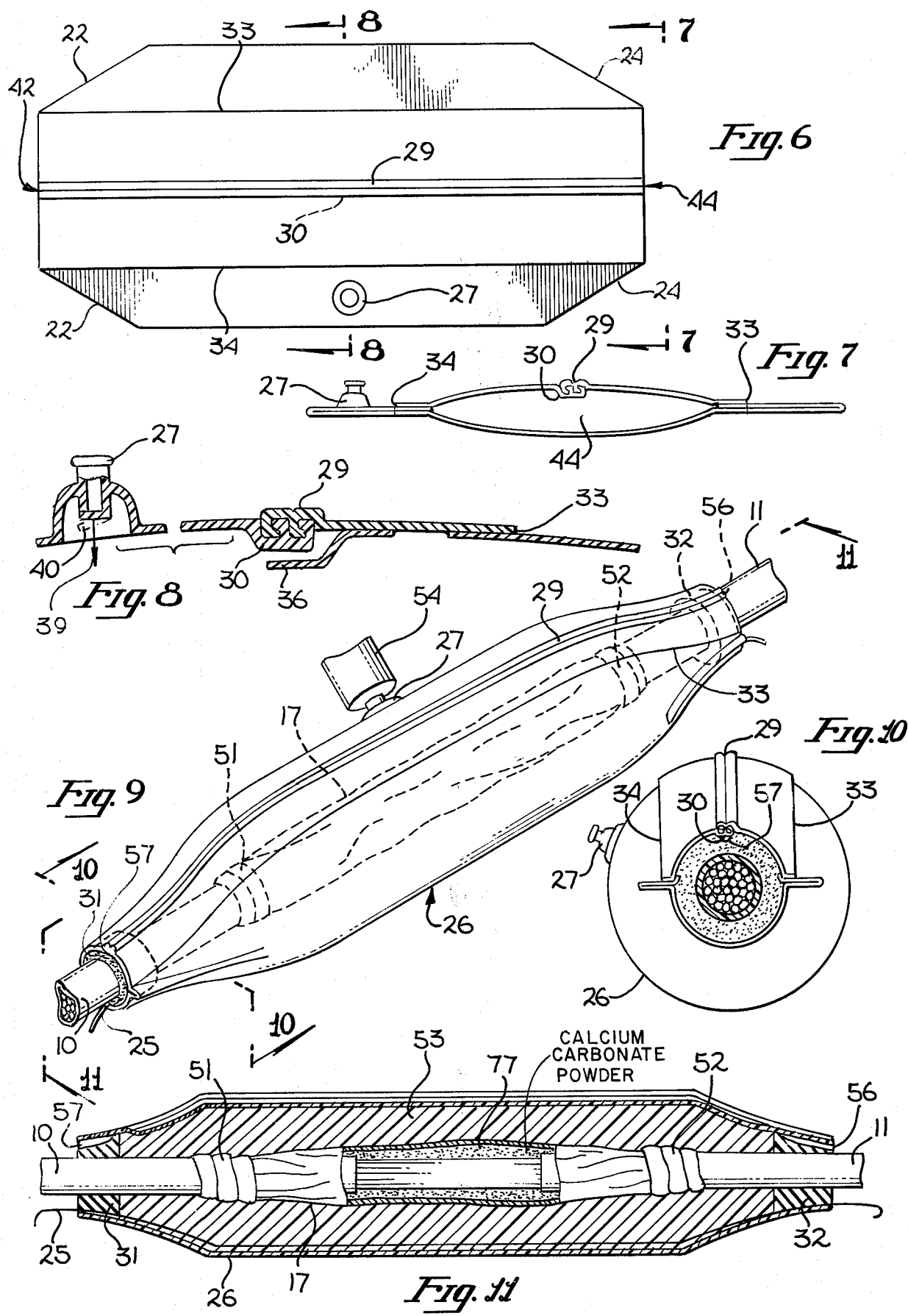

POWDER FILLED CABLE SPLICE ASSEMBLY

This application is a continuation-in-part of my earlier filed copending application, Ser. No. 347,435, filed on Apr. 3, 1973, now U.S. Letters Pat. No. 3,836,702.

BACKGROUND OF THE INVENTION

1. Field of the Invention

This invention relates to the field of cable splice protection means and, more particularly, to a powder filled cable splice assembly used to protect cables containing a plurality of spliced conductors.

2. Prior Art

Cables which contain a plurality of conductors, such as telephone cables, often require splicing, that is, the connection of one conductor to another. Typically, cables comprising a plurality of individual conductors, especially those used as telephone cables, are often-times buried in the ground or suspended from poles and, therefore, any splice therein must be capable of withstanding a variety of environmental conditions. There have been many prior art attempts to protect such splices, but they all contain a number of shortcomings. One prior art cable splice assembly consists of wrapping the entire splice area with tape until there are no exposed conductors. However, this splice assembly does not insure the integrity of the splice in that tape is susceptible to the surrounding environment and is not usually as strong as the original cable covering material.

Another prior art cable splice assembly is disclosed in Wright, II, U.S. Pat. No. 2,452,823. Wright, II shows multiple coverings of copper, tape, insulant, wire, and vulcanizable rubber over a desired conductor to form a cable splice. While this assembly is fairly effective to protect the cable splice from the elements, it is complex, requires special purpose machinery and is time consuming.

Another prior art assembly is disclosed by Bollmeier et al in U.S. Pat. No. 2,967,795. Bollmeier et al. teach wrapping the conductors in wire mesh and tape. The wrapped conductors are then put in a plastic envelope which is filled with a liquid resinous material such as asphalt. This assembly is also complex and costly.

Thus, the prior art assemblies are either ineffective to protect the cable splice from the elements, e.g. the tape, or are somewhat effective, but are complex and costly. The present invention is a further improvement of the invention disclosed in my copending application, Ser. No. 347,435, which taught one means to overcome the shortcomings of the prior art. In the present invention, a powder is disposed in the inner cover and completely surrounds the spliced conductors. Because the protective powder is compressed by the insulative foam material in the outer jacket, improved protection of the spliced cables from the elements is achieved.

Thus, the present invention provides a splice assembly, which may be either temporary or permanent, and which is easy to install and inexpensive. In addition, the present invention provides excellent protection for the conductors from the elements.

SUMMARY OF THE INVENTION

A powder filled electrical splice assembly is described, particularly adaptable for enclosing and protecting spliced cables such as cables typically comprising a plurality of conductors. This invention comprises:

i. an inner cover disposed about the spliced conductors. The inner cover is a generally elongated flexible plastic member having a first pair of interlocking tracks fixedly secured to corresponding edges along the length of the cover. The tracks proving a means for securing the inner cover circumferentially about the spliced conductors;

ii. a protective powder disposed within the enclosed volume of space defined by the inner cover and the conductors. The powder serves to help protect the conductors from the elements, such as moisture, water and air;

iii. an outer jacket disposed about the inner cover and the conductors. The outer jacket is a generally flexible plastic member having end apertures through which the conductors may pass, and a second pair of interlocking tracks fixedly secured along the length of the jacket. The tracks enable the outer jacket to be slipped around the conductors and the inner cover. The outer jacket also has at least one unidirectional valve; i.e., a valve which allows a fluid to pass from the exterior to the interior of the jacket;

iv. a means for sealing the apertures in the outer jacket, for example, porous gaskets; and v. an insulative foam material disposed within the outer jacket.

It is therefore one object of the present invention to provide a powder filled cable splice assembly which protects spliced conductors from corrosion and other environmental hazards.

Another object of the present invention is to provide a splice assembly which is strong, rugged, yet inexpensive and easy to use.

The novel features which are believed to be characteristic of the invention, both as to its organization and method of operation, together with further objectives and advantages thereof, will be better understood from the following description considered in connection with accompanying drawings in which a presently preferred embodiment of the invention is illustrated by way of example. It is to be expressly understood, however, that the drawings are for the purpose of illustration and description only and not intended as a definition of the limits of the invention.

BRIEF DESCRIPTION OF THE DRAWINGS

FIG. 1 is a perspective view of a first cable spliced to a second cable, each cable comprising a plurality of conductors.

FIG. 2 is a partial perspective view of the inner cover showing interlocking interloocking tracks along its edge.

FIG. 3 is a perspective view of a partially assembled cable splice assembly, showing the inner cover disposed about the conductors, and the protective powder being poured into the inner cover.

FIG. 4 is a perspective view of the cables showing the inner cover disposed about the spliced conductors and taped to the cables.

FIG. 5 is a perspective view of the cable splice assembly of FIG. 4 with the addition of the outer jacket.

FIG. 6 is a plan view of the outer jacket.

FIG. 7 is a end view of the outer jacket taken from section line 7—7 of FIG. 6.

FIG. 8 is a partial cross sectional view of the outer jacket taken through section lines 8—8 of FIG. 6 to illustrate the valve and interlocking tracks.

FIG. 9 is a perspective view of the cable splice assembly showing the outer jacket of FIG. 5 completely closed and the liquid foam material being injected through the valve in the outer jacket.

FIG. 10 is a end view of the cable splice assembly of FIG. 9 along line 10—10.

FIG. 11 is a cross sectional view of the completed cable splice assembly taken through section lines 11—11 of FIG. 9.

DETAILED DESCRIPTION OF THE INVENTION

Referring first to FIG. 1, there is shown, as a presently preferred embodiment, a cable 10 which includes a plurality of insulated conductors 13a and 13b and a second cable 11 with insulated conductors 14a and 14b. The conductors are typically contained within a cover 12 made of a strong, flexible insulative material such as rubber and the like. In FIG. 1, cables 10 and 11 are shown with the insulation 12 and 12a stripped away to expose the inner conductors 13a and 13b, and 14a and 14b, respectively. The conductors are spliced to each other by conventional means, such as solder, welding or connectors, so as to insure a good electrical connection. In FIG. 1, conventional crimp connector 15 is shown as the means for splicing the conductors 13 and 14 within the cables 10 and 11.

After splicing of the conductors 13 and 14, an inner cover 17 shown in FIG. 2, is placed about the plurality of conductors. The inner cover 17 is a generally elongated flexible plastic member fabricated from two sheets of polyolefin, polyvinyl chloride or other suitable material. The two sheets are joined along the length of one pair of edges to form a seam 28. The other edges of the sheet have a pair of interlocking tracks 18 and 20 fixedly secured along their length. In one embodiment, the interlocking tracks 18 and 20 are secured to the inner cover 17 by heat fusion and the like; they may also be fabricated as part of the inner cover 17 utilizing well known extrusion techniques. In the presently preferred embodiment, the interlocking tracks 18 and 20 are similar to those disclosed in U.S. Pat. No. 2,960,561. Other inner covers, such as a sleeve or a wrapping of material, are also within the scope of this invention.

In the presently preferred embodiment, inner cover 17 is partially closed circumferentially around the conductors 13 and 14 by the engagement of interlocking tracks 18 and 20 at ends 70 and 72 thereof, as indicated in FIG. 3. The inner cover 17 extends beyond the area where the conductors 13 and 14 have been spliced. Next, a protective powder 77 is poured from a container 79 into the inner cover 17 in the area of the spliced conductors. Sufficient powder 77 is poured in to completely surround and cover the spliced conductors. The specific protective powder generally should (i) have a high dielectric coefficient; (ii) have good heat insulation properties; (iii) be non-miscible with water, and (iv) be sufficiently fine so as to flow like a fluid. The latter property enables the powder to fill the interspatial voids between the conductors in the cable. In the presently preferred embodiment, the protective powder used is calcium carbonate. After the powder 77 is poured into inner cover 17, the interlocking tracks 18 and 20 of the inner cover are completely engaged along their entire length, thereby completely closing the inner cover around the conductors 13 and 14 and the powder 77. Next the ends 70 and 72 of the inner cover 17 are secured to corresponding cables 10 and 11 respectively with an attaching means, such as tape 51 and 52, as shown in FIG. 4. Care should be taken in taping the ends of the inner cover to prevent any protective powder from spilling out. The amount of powder used should be chosen such that when the inner cover is taped to the cables, the powder is loosely packed, but completely covers the spliced conductors.

With reference to FIG. 5 an outer jacket 26 is shown disposed about the inner cover 17 and extending beyond the ends of inner cover 17 to the outer surface of cables 10 and 11 such that the entire inner cover is completely enclosed. The outer jacket 26 is clearly shown in FIGs. 6 and 7 and is a generally cylindrical flexible plastic member having first and second tapered ends 22 and 24. The tapered ends of the outer jacket 26 aid in forming a seal between the cables and the outer jacket 26. These ends also form the apertures 42 and 44 shown in FIGS. 5 and 6 through which the cables pass.

The outer jacket 26 may be fabricated from a material such as described for inner cover 17. The plastic may be transparent enabling a visual inspection of the injected foam material, or colored, enabling a coding of the splice assemblies used for various cables. In the presently preferred embodiment, a transparent plastic, somewhat thicker than that utilized for inner cover 17, is used for outer jacket 26. As seen clearly in FIGS. 7 and 8, the interlocking tracks 29 and 30 allow the outer jacket to be slipped over the cables and then secured in place. The interlocking tracks are similar to those known in the prior art, such as described for the inner cover 17, and may be secured to the outer jacket 26 by heat fusion or other known techniques forming seams 33 and 34. The tracks may also be fabricated as part of the outer jacket by known extrusion techniques.

A valve 27 is mounted to the outer jacket 26 to allow a liquid to be injected into the interior of the outer jacket. The valve 27 has a gate means 40 shown in FIG. 8 which allows the liquid to flow only in the direction 39. In the presently preferred embodiment valve 27 is a check valve, but other valves capable of the same flow control are within the scope of the invention, such as those having a cross-slit, flexible disc, or semispherical member. A flap 36 may be positioned on the inner surface of the outer jacket 26, in the area near the interlocking tracks 29 and 30, as shown in FIG. 8, to prevent the expanding foam from contacting the interlocking tracks 29 and 30. Keeping the tracks of the outer jacket 26 relatively free of the foam facilitates removal of the jacket, as may be required for further repair or inspection. This flap may be plastic and extends longitudinally over the length of the tracks.

Before the outer jacket 26 is placed over the inner cover 17 and cables 10 and 11, FIG. 4 indicates that a section 21 of cable 10 and a section 23 of cable 11 are cleaned and then roughened, for example, with a steel brush. A pair of sealing means, for example, gaskets 31 and 32, which may be resilient sponge-like material, are placed about the sections 21 and 23 such that a seal is formed between the outer jacket 26 and the cables as shown in FIG. 5. These sealing means are disposed on the cables at positions which generally correspond to the ends of the outer jacket 26 and may be secured to the cables with tape, glue, etc.

A ripcord or wire 25 shown in FIG. 4 may be placed within the outer jacket 26 such that it extends beyond the ends of the outer jacket through the apertures 42 and 44. This cord is utilized to remove the insulative foam material when inspection or repair of the splice is desired. In the latter event, the outer jacket 26 is first removed. Its inside surfaces may be coated with a release agent or otherwise provided with a nonadhering surface to facilitate its removal. The cord 25 is then pulled so as to remove the foam from around the inner cover 17. Next, the inner cover 17 is removed, and the power brushed away to expose the spliced conductors.

After the outer jacket 26 has been placed about the cables 10 and 11 and the interlocking tracks 29 and 30 are secured, the outer jacket is filled with a liquid foam material 53 as shown in FIG. 9. In the presently preferred embodiment, the liquid foam material 53 is a two-part mixture, one part of which is a catalyst. The mixture begins to harden approximately 45 seconds after mixing. This has been found to be sufficient time to allow injection of the material 53 into the outer jacket 26 while it is still in a liquid state. Of course, the amount of time before hardening begins can be varied by using more or less catalyst. The liquid foam material 53 is disposed in injection means 54 and injected through the valve 27 into the interior of the outer jacket 26. Suitable liquid foam materials are well known in the art. They typically expand many times their original volume, and after curing, form a substantially rigid dielectric material.

Referring now to FIGS. 9, 10 and 11, ports 56 and 57 are defined where the ends of the interlocking tracks 29 and 30 contact the gaskets 31 and 32. These ports allow entrapped air and gas to escape from the interior of the outer jacket 26 during the injection and expansion of the liquid foam material 53. Note, however, that air and gas can also be vented through the gasket itself depending on the material used in its manufacture. For example, if gaskets 31 and 32 are made of a sufficiently porous material, air and gas could pass therethrough. The gaskets also act as foam barriers which help contain the insulative foam material 53 with the outer jacket 26. Referring particularly to FIG. 11, one can see that the insulative foam material 53 surrounds the inner cover 17 but does not come in contact with any conductors.

The liquid foam material 53, after hardening into a substantially rigid dielectric material, protects the splice from moisture and the like. In addition, the conductors 13 and 14 which are typically weakened by the splicing process, are now supported in the foam-filled cable splice assembly. Moreover, the insulative foam material 53 also compresses the inner cover 17, the protective powder 77 and conductors 13 and 14. This compression further secure the conductors in place, thereby preventing most movement in normal use.

It has been found that an insulative foam material alone is not sufficient to completely protect the spliced conductors from the elements. For example, entrapped air and moisture in the inner cover 17 may cause a weakening of the conductors 13 and 14 by corrosion. Moisture can enter the inner cover 17 when the conductors 13 and 14 are first spliced together or when the assembly is placed in the ground. Even the present splice assembly, without the protective powder 77 is susceptible to moisture entering the inner cover 17 and causing deterioration of the conductors 13 and 14. To prevent this, the present invention teaches use of the protective powder 77, such as calcium carbonate, in the inner cover 17. When the liquid foam material expands and compresses the protective powder 77, the spliced conductors 13 and 14 tend to become more shielded from the environment. Inasmuch as most of the space surrounding the spliced conductors is taken up by the compressed powder 77, there is less air in contact with the conductors, and, therefore, less chance that any moisture will come in contact with them.

While the presently preferred embodiment has been described with a single cable being coupled to another single cable, it will be apparent to one skilled in the art that two or more cables may be connected within the splice assembly. For example, two cables may be spliced to a third cable. The desired conductors in each of the respective cables are joined, and then the inner cover 17 and outer jacket 26 are placed over the cables. The two cables then pass through aperture 42 of jacket 26, and the third cable passes through aperture 44 thereof. Additionally, the splice assembly may be used with pressurized cables since the assembly provides a pressure seal once the liquid foam material has hardened.

Although this invention has been disclosed and described with refrence to a particular embodiment, the principles involved are susceptible of other applications which will be apparent to persons skilled in the art. This invention, therefore, is not intended to be limited to the particular embodiment herein disclosed.

I claim:

1. An electrical cable splice assembly protecting a plurality of spliced conductors in a cable comprising:
    a. an inner cover disposed about said conductors in said cable;
    b. a protective powder disposed within said inner cover;
    c. an outer jacket disposed about said inner cover and said conductors, said conductors passing through corresponding apertures in first and second ends of said outer jacket;
    d. means sealing said apertures; and
    e. an insulative foam material disposed within the space between said outer jacket and said sealing means; whereby said splice assembly protects said conductors from the elements.

2. The assembly as defined in claim 1 wherein said inner cover has means securing said inner cover circumferentially about said conductors.

3. The assembly as defined in claim 1 wherein said inner cover is comprised of a generally elongated, flexible plastic member having a pair of interlocking tracks fixedly secured to corresponding edges along the length thereof, said tracks providing a means securing said inner cover circumferentially about said conductors.

4. The assembly as defined in claim 1 wherein the ends of said inner cover are taped to said cable.

5. The assembly as defined in claim 1 wherein said protective powder has a high dielectric coefficient and good heat insulation properties, is non-miscible with water and tends to flow like a fluid.

6. The assembly as defined in claim 1 wherein said protective powder is calcium carbonate.

7. The assembly as defined in claim 1 wherein said outer jacket is comprised of a generally cylindrical, flexible plastic member having a pair of interlocking tracks fixedly secured to corresponding edges along the length thereof, said pair of tracks securing said jacket around said conductors and said inner cover.

8. The assembly as defined in claim 1 wherein said outer jacket has fixedly secured thereto, at least one valve arranged and configured to allow a fluid to pass from the exterior to the interior of said jacket.

9. The assembly as defined in claim 1 wherein said inner cover and said outer jacket are made of a material selected from the group consisting of polyvinyl chloride and polyolefin.

10. The assembly as defined in claim 1 wherein said means sealing said apertures in said outer jacket are circumferentially disposed about and secured to said cable at locations thereon generally corresponding to said first and second ends of said jacket.

11. The assembly as defined in claim 1 wherein said means sealing said apertures in said outer jacket are first and second strips of resilient material.

12. An electrical cable splice assembly for protecting a plurality of spliced conductors in a cable comprising:
 a. an inner cover comprised of a generally elongated, flexible plastic member having a means for securing said inner cover circumferentially about said conductors;
 b. a protective powder disposed within said inner cover, said powder having a high dielectric coefficient, good heat insulation properties, being nonmiscible with water and tending to flow like a fluid;
 c. an outer jacket comprised of a generally cylindrical, flexible plastic member, said conductors passing through corresponding apertures in first and second ends thereof, said jacket having means securing said jacket around said conductors and said inner cover, said jacket having fixedly secured thereto at least one valve arranged and configured to allow a fluid to pass from the exterior to the interior of said jacket;
 d. means for sealing said apertures in said outer jacket, said means circumferentially disposed about and secured to said cable at locations thereon generally corresponding to said first and second ends of said jacket; and
 e. an insulative foam material disposed within the space between said outer jacket and said inner cover;
 whereby, said splice assembly protects said conductors from the elements.

* * * * *